United States Patent
Gorski

(10) Patent No.: US 10,040,642 B2
(45) Date of Patent: Aug. 7, 2018

(54) MULTIPLE SPEED CONVEYOR STORAGE SYSTEM

(71) Applicant: Amazon Technologies, Inc., Seattle, WA (US)

(72) Inventor: Christopher Albert Gorski, Gettysburg, PA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/631,457

(22) Filed: Jun. 23, 2017

(65) Prior Publication Data

US 2017/0283185 A1    Oct. 5, 2017

Related U.S. Application Data

(62) Division of application No. 14/860,660, filed on Sep. 21, 2015, now Pat. No. 9,688,479.

(51) Int. Cl.
| | |
|---|---|
| *B65G 1/00* | (2006.01) |
| *B65G 47/71* | (2006.01) |
| *B65G 43/00* | (2006.01) |
| *B65G 47/04* | (2006.01) |
| *B65G 47/68* | (2006.01) |

(52) U.S. Cl.
CPC ............ *B65G 47/71* (2013.01); *B65G 43/00* (2013.01); *B65G 47/04* (2013.01); *B65G 47/682* (2013.01); *B65G 1/00* (2013.01); *B65G 2203/0216* (2013.01); *B65G 2203/041* (2013.01); *B65G 2203/046* (2013.01)

(58) Field of Classification Search
CPC . B65G 1/00; B65G 1/02; B65G 47/46; B65G 47/5113; B65G 47/503

USPC ............................................. 198/347.1, 347.4
See application file for complete search history.

(56) References Cited

U.S. PATENT DOCUMENTS

| | | | |
|---|---|---|---|
| 5,007,521 A | 4/1991 | Tanaka | |
| 5,351,801 A | 10/1994 | Markin et al. | |
| 5,743,962 A | 4/1998 | Ogasawara et al. | |
| 5,966,309 A * | 10/1999 | O'Bryan | G01N 35/021 198/617 |
| 6,039,169 A | 3/2000 | Zaniboni | |
| 6,169,935 B1 | 1/2001 | Iwasaki et al. | |
| 8,042,676 B2 * | 10/2011 | Balk | B65G 47/5131 198/347.1 |
| 8,397,898 B2 | 3/2013 | Buchmann et al. | |
| 8,998,554 B2 | 4/2015 | Toebes et al. | |

(Continued)

OTHER PUBLICATIONS

U.S. Appl. No. 14/860,660, filed Sep. 21, 2015, Restriction/Election dated Jul. 18, 2016.

(Continued)

*Primary Examiner* — James R Bidwell
(74) *Attorney, Agent, or Firm* — Thomas | Horstemeyer, LLP

(57) ABSTRACT

Disclosed are various embodiments for a multiple speed, multiple conveyor storage system for items in a materials handling facility such as a fulfillment center. In one embodiment, the item storage system includes a first conveyor configured to operate at one speed, a second conveyor configured to operate at a different speed, and a transfer device configured to transfer items between the conveyors. The conveyors are each configured to store items in motion in a circuit arrangement.

20 Claims, 11 Drawing Sheets

(56) References Cited

U.S. PATENT DOCUMENTS

| | | | | |
|---|---|---|---|---|
| 9,688,479 B1* | 6/2017 | Gorski | ............... | B65G 47/50 |
| 2010/0300842 A1 | 12/2010 | Bastian et al. | | |
| 2010/0316468 A1 | 12/2010 | Lert et al. | | |
| 2016/0031655 A1* | 2/2016 | Broers | ............... | B65G 21/18 |
| | | | | 198/347.1 |
| 2016/0185962 A1* | 6/2016 | Zhou | ............... | C08L 85/02 |
| | | | | 524/112 |

OTHER PUBLICATIONS

U.S. Appl. No. 14/860,660, filed Sep. 21, 2015, Non-Final Office Action dated Oct. 25, 2016.
U.S. Appl. No. 14/860,660, filed Sep. 21, 2015, Response to Non-Final Office Action dated Oct. 25, 2016.
U.S. Appl. No. 14/860,660, filed Sep. 21, 2015, Notice of Allowance dated Feb. 22, 2017.
Miller, "Multi Channel Accumulation Concept", http://www.ambaflex.com/products/accuveyor-avx/ retrieved on Oct. 13, 2014.
Bastian Solutions, "Automated Storage & Retrieval Systems (ASRS)", http://www.bastiansolutions.com/automation/automated-storage-retrieval-systems-(asrs)/unit-load-asrs retrieved on Oct. 13, 2014.

* cited by examiner

MULTIPLE SPEED CONVEYOR STORAGE SYSTEM

CROSS-REFERENCE TO RELATED APPLICATIONS

This application is a division of, and claims priority to, co-pending U.S. patent application entitled "MULTIPLE SPEED CONVEYOR STORAGE SYSTEM," filed on Sep. 21, 2015, and assigned application Ser. No. 14/860,660, which is incorporated herein by reference in its entirety.

BACKGROUND

A fulfillment center is a materials handling facility that is equipped to store inventory and fulfill orders from the inventory. A variety of tasks may be performed in the fulfillment center including, for example, receiving shipments of new inventory, storing new inventory in storage locations, picking items from the inventory storage locations in response to receiving orders, grouping the picked items, packing the items, and readying the packed items for shipment. Sometimes agents performing a first type of task may work faster than agents performing a second type of task that follows the first type of task. As a consequence, items resulting from the first type of task may build up in a storage area of the fulfillment center until they can be processed in the second type of task.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a conveyor-based storage system for materials handling facilities such as fulfillment centers. For a variety of reasons, items resulting from a given task in a materials handling facility may build up in a storage area of the facility. For example, agents A performing the given task may be working faster than agents B performing a subsequent task. Allowing a buffer of items may be desirable so that both sets of agents can continue to work without disruption. Thus, agents A can continue to work while agents B are overloaded. Similarly, agents B can continue to work while agents A are reassigned to another task. In order to provide a buffer, items in a materials handling facility are typically placed on the floor or on shelves in a designated storage area.

However, storing items in this way is inefficient. Typical materials handling facilities have very high ceilings, such as fifty feet or higher, and a large floor storage area could waste a large amount of enclosed building volume. In addition, it may be difficult to find and/or access items when they are needed.

Various embodiments of the present disclosure introduce a conveyor-based storage system. Conveyors are conventionally used to move items from one location to another. However, in the present disclosure, conveyors may be used principally to store items in a circuit that rotates the items about the circuit indefinitely until they are needed. Further, as will be discussed, conveyors may be stacked vertically in order to maximize usage of the enclosed building volume in a materials handling facility. In this regard, items may be moved from one conveyor to a higher or lower conveyor by way of an elevator or a ramp-based conveyor, slide, or chute. Moreover, different storage conveyors may operate at different speeds relative to one another. A higher speed conveyor may allow items stored thereon to be accessed faster with relatively lower item capacity, while a lower speed conveyor may result in slower accessibility with relatively higher item capacity. A conveyor control system may track item locations on conveyors and coordinate movement of items from slower to faster conveyors and vice versa as desired.

Figure 1A:
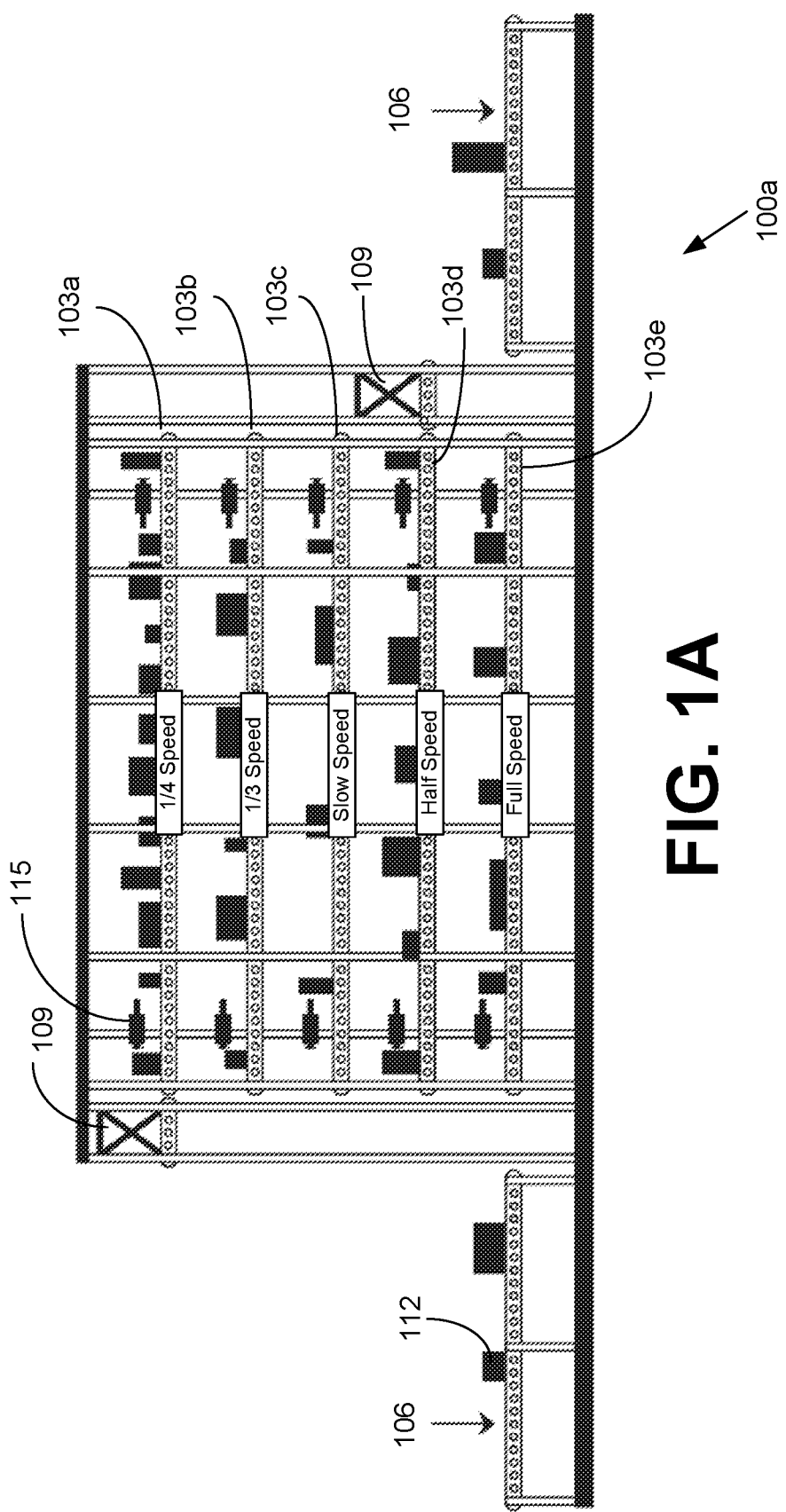
FIG. 1A is a lateral view of one example of an item storage system according to one embodiment of the present disclosure.

Turning now to FIG. 1A, shown is a lateral view of one example of an item storage system 100a according to one embodiment. The item storage system 100a includes a plurality of conveyors 103a, 103b, 103c, 103d, and 103e, a plurality of entry/exit points 106, and a plurality of elevators 109. At an entry/exit point 106, items 112 are received into the item storage system 100a. The entry/exit point 106 may comprise a belt conveyor, a lineshaft roller conveyor with a plurality of rollers, a chain conveyor, or any other conveyor system. In various embodiments, an entry/exit point 106 may be dedicated for entering items 112, dedicated for exiting items 112, or used for either entering or exiting items 112.

An item 112 may comprise a product, a package, a box, a tote containing one or more items, a bucket, and/or other types of containers. The item 112 may bear one or more identifiers, such as bar codes, quick response (QR) codes, radio-frequency identifiers (RFIDs), and/or other forms of identifiers. The entry/exit point 106 may include one or more sensors (e.g., imaging device, barcode scanner, RFID reader, etc.) configured to scan an identifier of each item 112 in order to determine which items 112 are entering into or exiting from the item storage system 100a.

From the entry/exit point 106, an item 112 is deposited onto one of the conveyors 103a . . . 103e, which are in a vertically stacked arrangement in this example. The conveyors 103 may individually comprise a belt conveyor, a lineshaft roller conveyor with a plurality of rollers, a chain conveyor, or any other conveyor system. Although five conveyors 103 are shown in this non-limiting example, it is understood that two or more conveyors 103 may be utilized in other examples. Each of the conveyors 103a . . . 103e is arranged in a circuit or ring arrangement, where items 112 on the respective conveyor 103 can continue traversing about the conveyor 103 indefinitely.

Two or more conveyors 103 are configured to operate at different speeds. In this example, the top conveyor 103a operates at "¼ speed," the conveyor 103b operates at "⅓ speed," the conveyor 103c operates at "slow speed" (e.g., a speed between "⅓ speed" and "half speed"), the conveyor 103d operates at "half speed," and the bottom conveyor 103e operates at "full speed." The conveyors 103 may have a fixed speed, or the speed may be variable. Higher speed conveyors 103 may be below lower speed conveyors 103 and vice versa. In some cases, it may be preferable to have higher speed conveyors 103 at or near the bottom of the item storage system 100a or at least near an exit point (e.g., a chute) in order for items 112 to be retrieved faster. The items 112 stored on a higher speed conveyor 103 (e.g., conveyor 103e) may be more widely spaced than on a lower speed conveyor 103 (e.g., conveyor 103a). Wider spacing may be necessitated, for example, in order to sweep, push, pull, or otherwise retrieve items 112 from the conveyor 103 when it is moving at a relatively fast speed.

The elevator 109 is configured to move one or more items 112 from one conveyor 103 to another. Although two elevators 109 are depicted in this example, one or some other number of elevators 109 may be employed in other examples. Some elevators 109 may be dedicated to moving items 112 higher, while other elevators 109 may be dedicated to moving items 112 lower. In some examples, an elevator 109 as depicted in FIG. 1A may be replaced with a chute that guides items 112 to a lower level. Under various circumstances, the elevator 109 may move items 112 up to a higher conveyor 103 or down to a lower conveyor 103. Shoe devices 115 may push, pull, or otherwise guide items 112 onto an elevator 109 or off of an elevator 109.

Figure 1B:
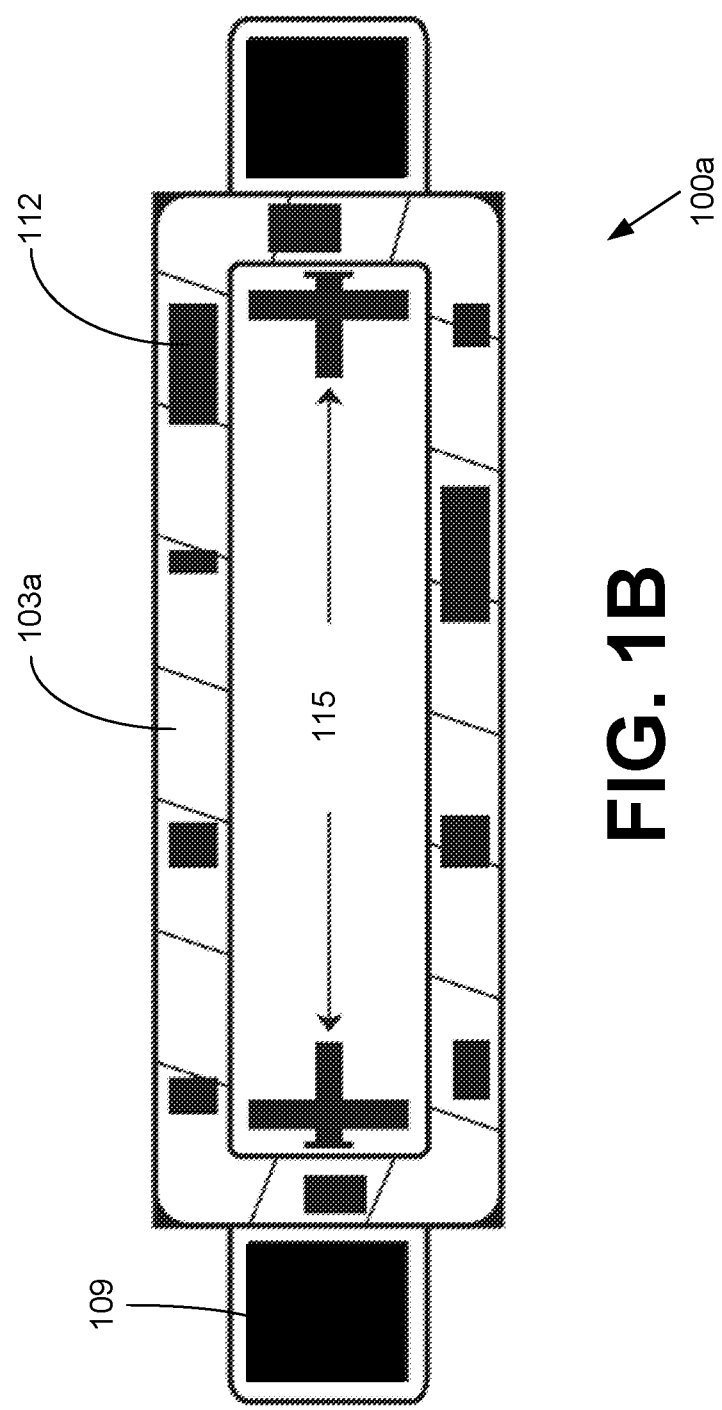
FIG. 1B is a top view of the item storage system of FIG. 1A according to one embodiment of the present disclosure.

Moving next to FIG. 1B, shown is a top view of the item storage system 100a of FIG. 1A according to one embodiment. FIG. 1B specifically illustrates the circuit or ring arrangement of the conveyors 103. However, it is noted that one or more of the conveyors 103 may have differing shapes. In some examples, a conveyor 103 may snake back and forth so as to fill up a given floor area. In other examples, a conveyor 103 may follow the perimeter of a building.

Figure 1C:
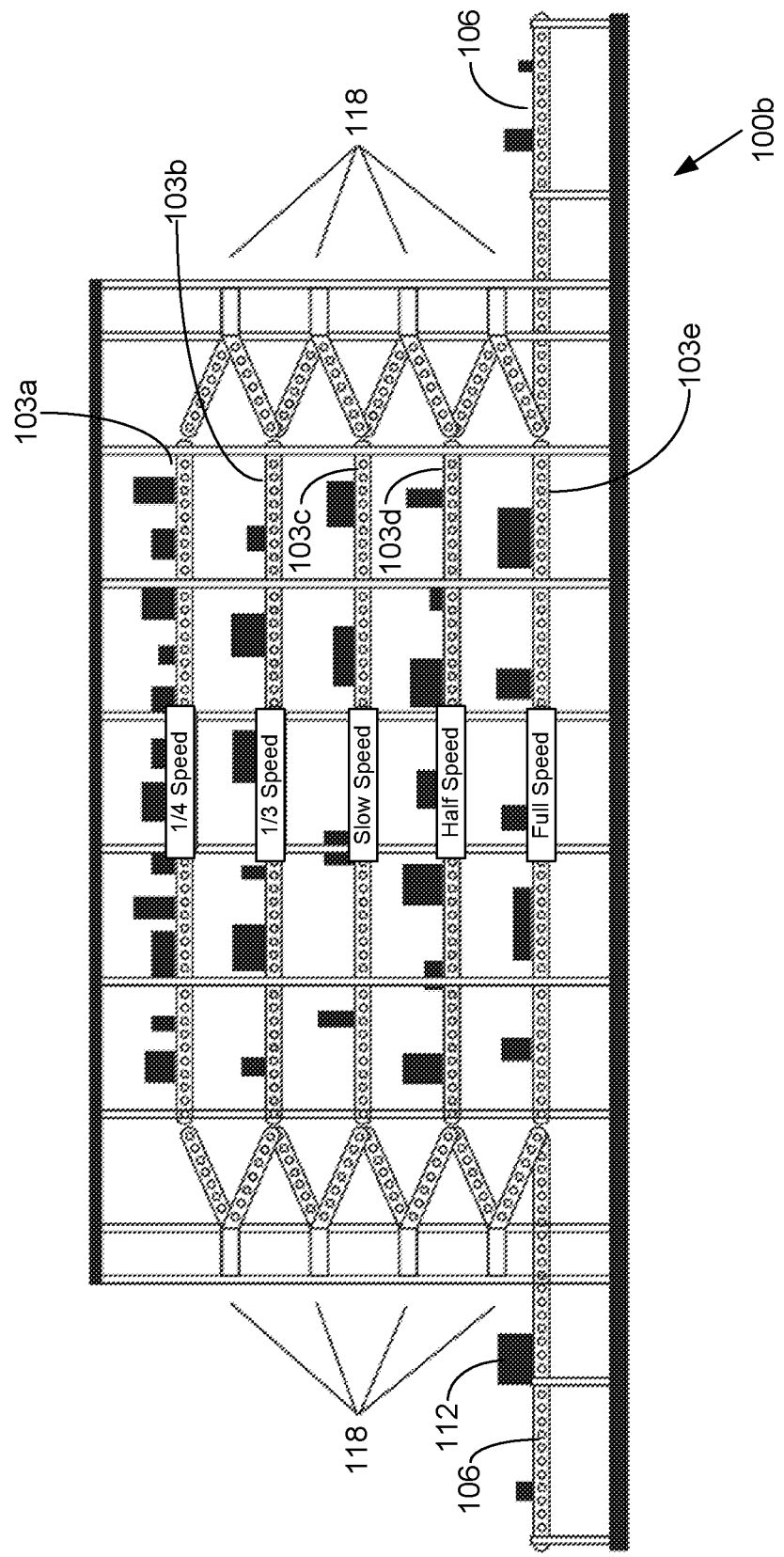
FIG. 1C is a lateral view of another example of an item storage system according to one embodiment of the present disclosure.

Continuing to FIG. 1C, shown is a lateral view of another example of an item storage system 100b according to one embodiment. As compared to the item storage system 100a (FIG. 1A), the item storage system 100b includes a plurality of ramp-based conveyors, slides, or chutes 118 configured to move items 112 from one conveyor 103 to another. In one embodiment, the ramp-based conveyors, slides, or chutes 118 may utilize a spiral arrangement. In some cases, ramp-based conveyors 118 may be dedicated to moving items 112 to a higher conveyor 103 or dedicated to moving items 112 to a lower conveyor 103. In other cases, ramp-based conveyors 118 may be operable to move items 112 either higher or lower. Multiple ramp-based conveyors, slides, or chutes 118 may be present for a given conveyor 103 to move items 112 to multiple destination conveyors 103.

Figure 1D:
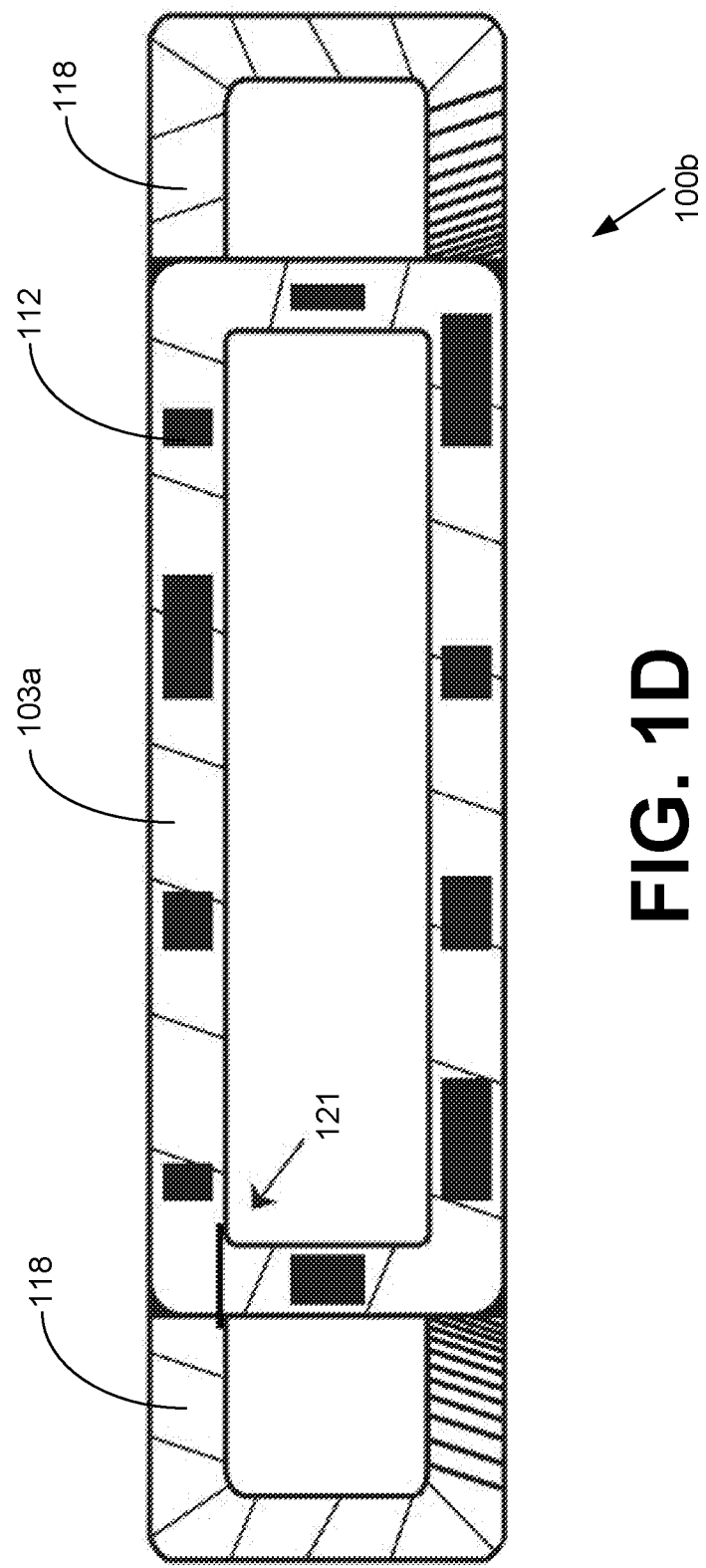
FIG. 1D is a top view of the item storage system of FIG. 1C according to one embodiment of the present disclosure.

Referring next to FIG. 1D, shown is a top view of the item storage system 100b of FIG. 1C according to one embodiment. FIG. 1D specifically illustrates an example of a track redirector 121 that can redirect items 112 to or from a ramp-based conveyor, slide, or chute 118. In this regard, the track redirector 121 may perform the same function as the shoe devices 115 (FIG. 1A) with respect to the elevators 109 (FIG. 1A) in the item storage system 100a (FIG. 1A).

Figure 1E:
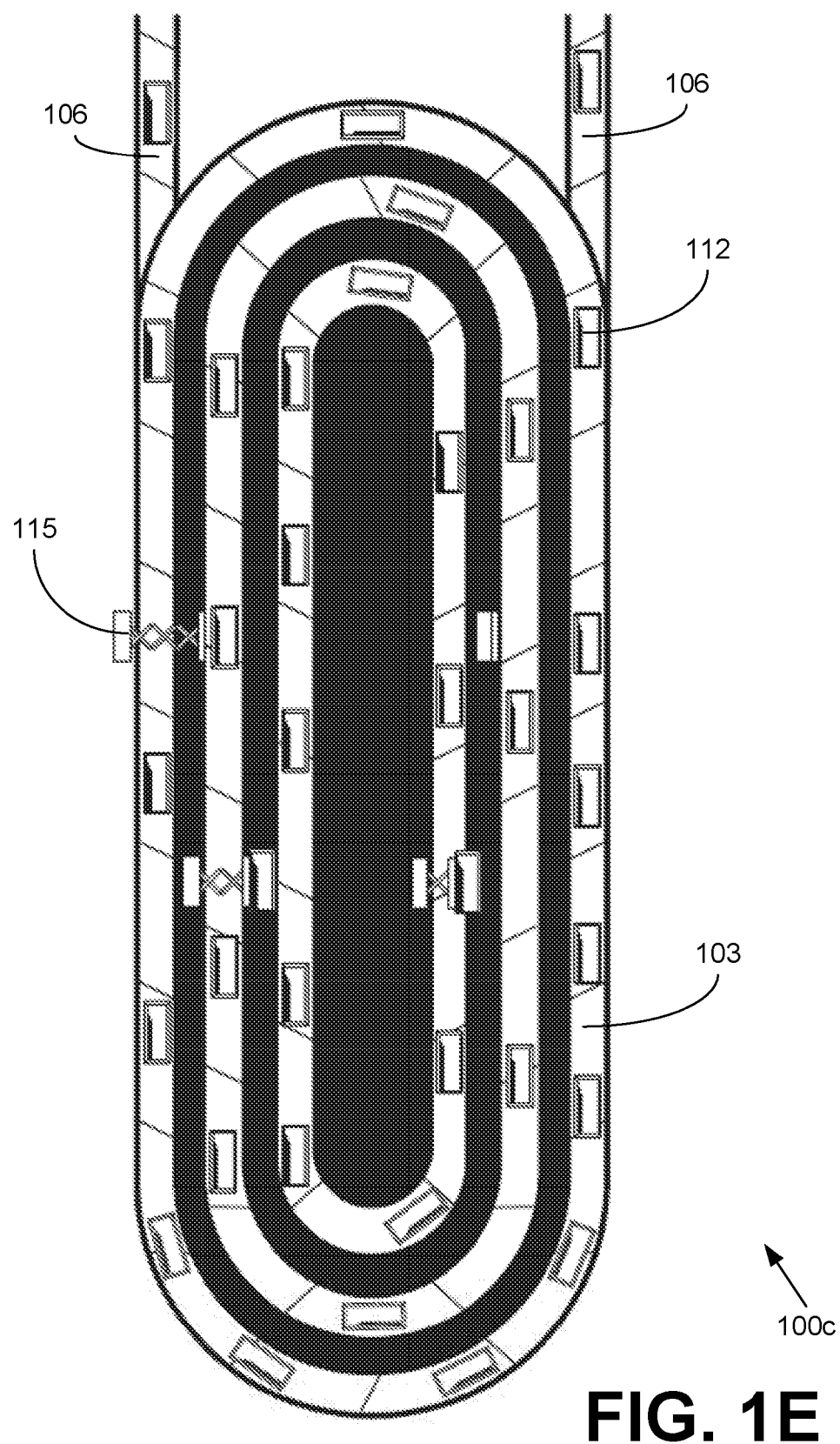
FIG. 1E is a top view of another example of an item storage system according to one embodiment of the present disclosure.

Continuing to FIG. 1E, shown is a top view of another example of an item storage system 100c according to one embodiment. Alternatively or in addition to using the vertically stacked approach of item storage systems 100a (FIG. 1A) and 100b (FIG. 1C), the item storage system 100c adopts a concentric approach that may be deployed on a single level. In this example, three concentric conveyors 103 are employed. Specifically, when items 112 enter the item storage system 100c at an entry/exit point 106, the items 112 may be directed to an outer conveyor 103. Transfer devices 115 (e.g., a shoe) may push an item 112 from an outer conveyor 103 to a middle conveyor 103 and vice versa. As with the previously discussed item storage systems 100a and 100b, the conveyors 103 in this example may be operating at different speeds.

The conveyor 103 associated with providing access to items 112 to users or other stations and processes may generally have the highest speed in order to provide fast access. In one example, the innermost conveyor 103, which may also be the shortest conveyor 103 in length, may be operating with the lowest speed. In this example, the outermost conveyor 103 may be operating with the highest speed. This arrangement would facilitate fast access to items 112 via the outermost conveyor 103, which may have direct access to entry/exit points 106.

In another example, the innermost conveyor 103 may be operating with the highest speed. As the shortest conveyor 103 in length, the innermost conveyor 103 would provide the fastest access to the items 112 stored thereon for a given speed. In this example, an entry/exit point 106 may be directly coupled to the innermost conveyor 103 to avoid transferring items 112 to outer conveyors 103 for an exit.

Although the non-limiting example of FIG. 1E shows three conveyors 103, other numbers of conveyors 103 may be used in other examples. Further, it is not necessary that the conveyors 103 be in a specific oval-type shape, and the conveyors 103 may cross over one another and/or otherwise diverge at points from concentricity. In some examples, an item storage system 100c may employ both vertically stacked conveyors 103 and concentric conveyors 103. For instance, concentric conveyors 103 may be vertically stacked as desired.

Figure 2:
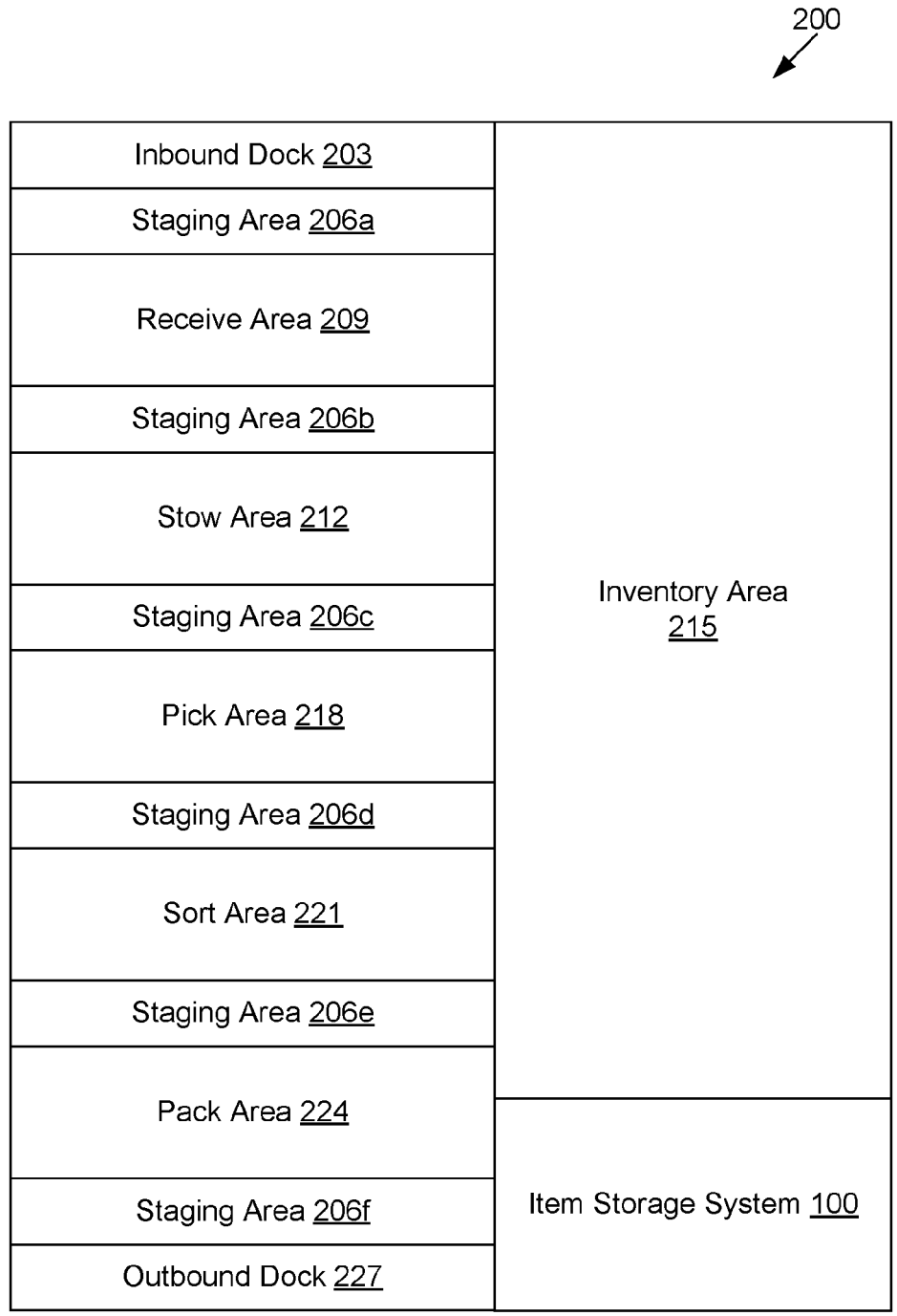
FIG. 2 is a diagram illustrating one example of a fulfillment center according to one embodiment of the present disclosure.

With reference to FIG. 2, shown is one example of a fulfillment center 200 according to one implementation. The fulfillment center 200 is one example of a materials handling facility that is equipped to store inventory and fulfill orders from the inventory. The fulfillment center 200 includes a number of different areas where inventory is stored and staging and processing occur. A fulfillment center 200 performs both inbound and outbound processing of inventory. An example of the operation of the fulfillment center 200 that refers to the various areas of the fulfillment center 200 will next be described.

Beginning with inbound processing, inventory arrives at the inbound dock 203. For example, tractor trailers and/or other vehicles may arrive from manufacturers, distributors, sellers, and/or other vendors of items. These vehicles may carry items in pallets, boxes, totes, and/or other containers. In some cases, bulk goods may be received without containers. Agents offload the vehicles and store the pallets, boxes, etc., in the staging area 206a for further processing.

Next, agents in the receive area 209 retrieve pallets, boxes, etc., from the staging area 206a and begin processing the inventory contained therein. For example, the agents in the receive area 209 may record receipt of the pallets, boxes, etc., and then retrieve the items contained therein. The agents in the receive area 209 may verify the integrity of the items and confirm a received quantity. Tracking identifiers such as bar codes, radio-frequency identifiers (RFIDs), and/or other identifiers may be affixed to the items to facilitate tracking within the fulfillment center 200.

Various item preparation procedures on the received items may be performed based upon the type of item. The item preparation may be designed so as to protect the item during handling and/or storage of the item within the fulfillment center 200. For example, fragile items may be bubble wrapped, and items that could be damaged by dust may be placed within plastic bags. The item preparation for a particular item may also be designed to protect other items from the particular item. For example, an item with a potentially objectionable odor may be specially packaged so as not to transfer the odor to other items. Some items may be handled and stored without any special item preparation.

The items in the receive area 209 may then be placed in totes or other containers and/or on carts within the staging area 206b, ready to be stowed. Agents in the stow area 212 retrieve the totes and/or stow carts from the staging area 206b and proceed to store the items contained therein in the inventory area 215. The inventory area 215 may be organized into a number of storage locations, such as bins, slots, shelves, etc. However, it is noted that the entire inventory area 215 may be replaced with an item storage system 100 in accordance with examples of the present disclosure. An agent given a particular stow cart may be assigned a particular route within the inventory area 215 for efficiency purposes. The agent is presented with an assigned storage location for each item to be stowed, and the agent may perform one or more actions to confirm that the item has been stowed in the assigned storage location. After stowing the items, the agent may return the stow cart, totes, etc., to the stow area 212 and receive another assignment.

Outbound processing of the fulfillment center 200 begins in the pick area 218. Agents in the pick area 218 may be instructed to pick items from storage locations in the inventory area. To this end, the agents may retrieve totes and/or other containers and carts from the staging area 206c. The agents may then be presented with an efficient pick route through the inventory area to pick a list of specific items for one or more customer orders. Upon arriving at a storage location, an agent may retrieve the item from the bin, slot, shelf, etc., and then scan an identifier of the item to verify that the item has been picked. The agent then places the item in a particular tote. Upon returning to the pick area 218, the agent places the totes in the staging area 206d.

Agents in the sort area 221 obtain totes from the staging area 206d and proceed to sort the items in the totes using sortation carts. For purposes of efficiency, items may be picked from inventory separately from a grouping specified in an order. Thus, a given tote may contain items ordered by different customers, and items ordered by a given customer may be picked by different agents in different totes. The items are ultimately collated into order-based groupings in the sort area 221 using the sortation carts. In an alternative fulfillment center 200, individual orders may be separately picked, thereby obviating the need for additional sortation. The sortation carts of items are then transferred to the staging area 206e.

Agents in the pack area 224 obtain the items from the sortation carts in the staging area 206e and proceed to pack the items for shipment. To this end, an agent may retrieve a set of items from a sortation cart, retrieve appropriate packaging for the set of items, and then pack the set of items in the packaging. An agent may affix one or more identifiers or labels (e.g., a shipping label or an internal transportation tracking label) to the outside of the packaging. In some cases, additional processing may be performed on an item before it is packed. For example, an agent may gift wrap an item before it is packed. The packages may then be transported to the staging area 206f, where they may be organized for pick up by shipping carriers at the outbound dock 227.

The staging areas 206 in the foregoing discussion are understood to correspond to work buffers in the inbound and outbound pipelined processes of a fulfillment center 200. One or more of these staging areas 206 may correspond to dedicated space within the fulfillment center 200. Alternatively, one or more of these staging areas 206 may correspond to usage of an item storage system 100, such as the item storage system 100a (FIGS. 1A & 1B), the item storage system 100b (FIGS. 1C & 1D), or the item storage system 100c (FIG. 1E). That is to say, agents performing one task may load inventory into the item storage system 100, while agents performing another task may retrieve inventory from the item storage system 100. Also, the inventory area 215 may be replaced, partially or completely, by an item storage system 100. That is, the inventory area 215 may be considered as a buffer between two tasks (i.e., between stow and pick).

The foregoing discussion is not intended to be limiting. For example, alternative examples of fulfillment centers 200 may be organized into areas differing from those depicted in FIG. 2. Also, some areas in the fulfillment center 200 may overlap or share the same floor space. When tasks are described above as being performed by agents, it is understood that the tasks may be performed partially or wholly by machines, e.g., conveyor belts, robotic moving shelves, robotic pickers or stowers, machines for affixing labels, bar code and RFID scanners, and so on. In the following discussion, a general description of the system and its components is provided, followed by a discussion of the operation of the same.

Figure 3:
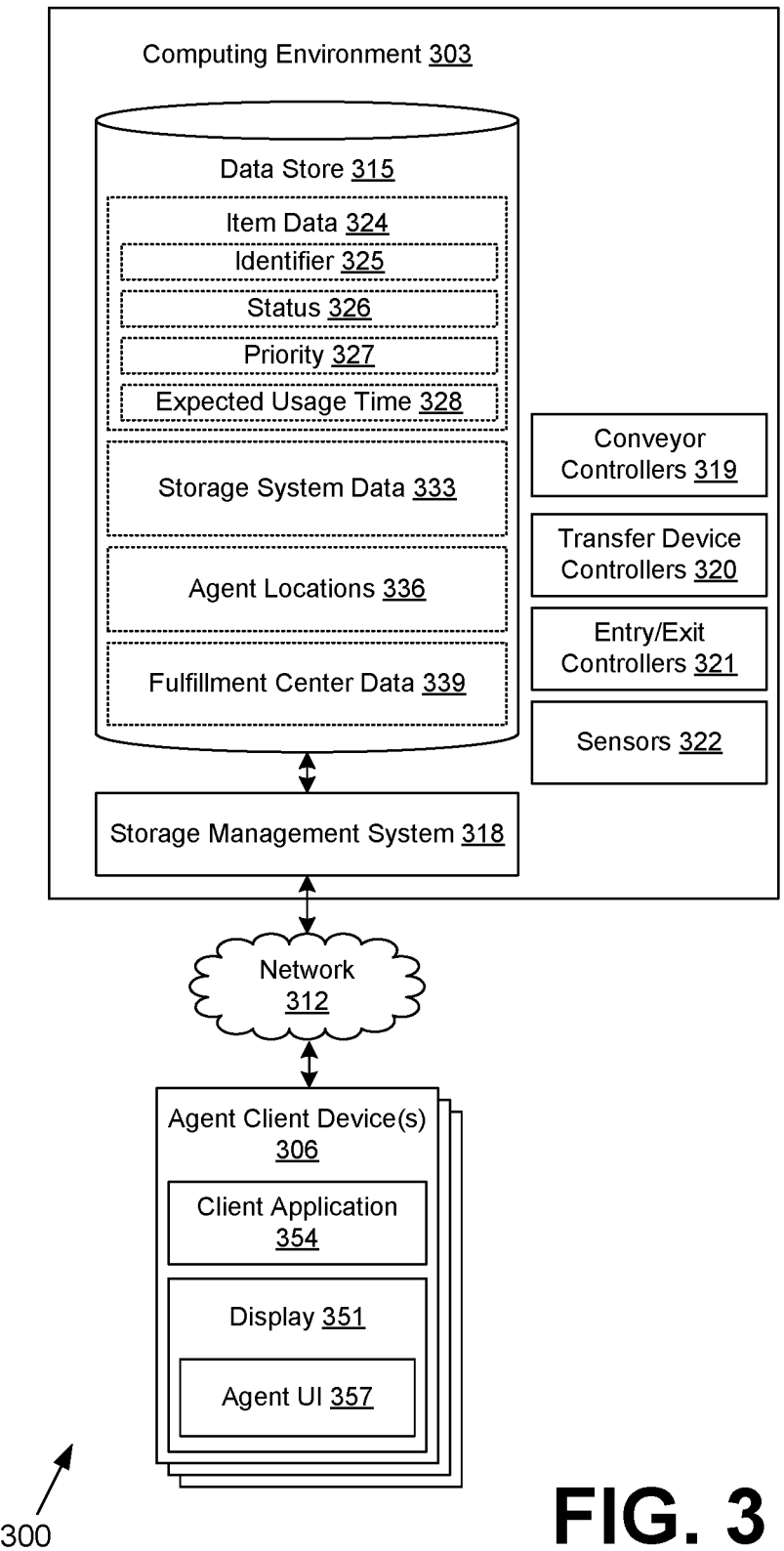
FIG. 3 is a schematic block diagram of a networked environment according to various embodiments of the present disclosure.

With reference to FIG. 3, shown is a networked environment 300 according to various embodiments. The networked environment 300 includes a computing environment 303 and one or more agent client devices 306, which are in data communication with each other via a network 312. The network 312 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various implementations. Also, various data is stored in a data store 315 that is accessible to the computing environment 303. The data store 315 may be representative of a plurality of data stores 315 as can be appreciated. The data stored in the data store 315, for example, is associated with the operation of the various applications and/or functional entities described below.

The components executed on the computing environment 303, for example, include a storage management system 318, one or more conveyor controllers 319, one or more transfer device controllers 320, one or more entry/exit controllers 321, one or more sensors 322, and other applications, services, processes, systems, engines, or functionality not discussed in detail herein. The storage management system 318 is executed to manage the storage of items 112 (FIG. 1A) in the item storage system 100 (FIG. 2). In particular, the storage management system 318 maintains a current state of the item storage system 100 and may direct agents to deposit items 112 at specific entry points and to retrieve items 112 from specific exit points. Further, the storage management system 318 manages the internal workings of the item storage system 100 such that items 112 may be moved from slower to faster conveyors 103 (FIG. 1A) and vice versa as desired.

In this regard, the storage management system 318 is in communication with conveyor controllers 319, transfer device controllers 320, entry/exit controllers 321, sensors 322, and/or other devices. The conveyor controllers 319 manage the operation of the conveyors 103, including controlling the speed of each of the conveyors 103. The transfer device controllers 320 manage the operation of transfer devices that move items 112 to and from conveyors 103. Such transfer devices may include elevators 109 (FIG. 1A), shoe devices 115 (FIG. 1A), ramp-based conveyors 118 (FIG. 1C), track redirectors 121 (FIG. 1D), and/or other devices configured to facilitate transferring items 112 onto specific conveyors 103 or off of specific conveyors 103. The entry/exit controllers 321 manage the receipt of items 112 via an entry/exit point 106 (FIG. 1A) or the exit of items 112 via the entry/exit point 106. The sensors 322 may include cameras, barcode scanners, RFID scanners, etc., that can identify specific items 112 as they are being received, or while they are on conveyors 103 or elsewhere in the item storage system 100.

The data stored in the data store 315 includes, for example, item data 324, including an identifier 325, a status 326, a priority 327, and/or an expected usage time 328 for each item 112, storage system data 333, agent locations 336, fulfillment center data 339, and potentially other data. The item data 324 contains data regarding items 112 in a fulfillment center 200 (FIG. 2) or in transit to the fulfillment center 200. The items 112 may include specific products being prepared for shipment, bulk packages of products being prepared for storage in storage locations, collections of products that have been picked for shipments, and others. Each item 112 may be associated with an identifier 325, a status 326, a priority 327, and/or an expected usage time 328.

The identifier 325 may correspond to a unique identifier that may uniquely correspond to the item 112 or a class of the items 112. The identifier 325 may be scanned from a barcode, QR code, RFID, etc., situated on or in the item 112. The status 326 may indicate the location of the item 112 in the fulfillment center 200, a previous task that has been completed for the item 112, or a next task to be performed for the item 112. The priority 327 may control a speed of processing of the item 112 in the fulfillment center 200 versus other items 112. For example, some items 112 may be associated with a high priority 327 to provide expedited processing and shipping, while other items 112 may be associated with a low priority 327 to provide a slower level of service, which may be associated with lower costs to customers. The expected usage time 328 may correspond to a predicted time at which the item 112 is predicted to be needed for processing of a next task (e.g., stocking, sorting, packing, etc.)

The storage system data 333 includes data regarding a current state of the item storage system 100. Such data may include current speed of the conveyors 103, items 112 currently on each of the conveyors 103, empty spaces on the conveyors 103, status of the transfer devices, status of the entry/exit points 106, and so on. The information in the storage system data 333 may be determined based at least in part on data received from the sensors 322.

The agent locations 336 indicate the locations of the various agents, and potentially, problem solver agents, within the fulfillment center 200. In one implementation, the locations may be determined based upon data reported by personal mobile devices of the agents. For example, a mobile phone carried by an agent may periodically report coordinates from the global positioning system (GPS) or another location-finding service. The resolution of the locations may enable pinpointing the exact position of the agents within the fulfillment center 200.

In another implementation, a location may be determined by the task or a previous task performed by the respective agent. To illustrate, an agent may scan in an identifier as part of performing a current or previous task. For example, the agent may scan in a barcode or an RFID of a storage bin into which the agent is to place an item to be stowed. The identifier, in turn, corresponds to a predetermined physical location within the fulfillment center 200. That is to say, the physical location of the particular storage bin within the fulfillment center 200 may be known, and by scanning the particular identifier, it may be determined that the agent is physically present at the particular location.

The fulfillment center data 339 may include various data about the layout and state of the fulfillment center 200. For example, the fulfillment center data 339 may include information from fulfillment systems, electronic commerce systems, and so on that pertains to the inbound inventory, current inventory, outbound inventory, and associated workloads, of the fulfillment center 200. The fulfillment center data 339 may also track historical information regarding the fulfillment center 200, including staffing levels, task outputs, problem frequencies, and other data.

The agent client devices 306 may be representative of a plurality of client devices that may be coupled to the network 312. Each of the agent client devices 306 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smart watches, or other devices. The agent client devices 306 may include a display 351. The display 351 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The agent client devices 306 may be configured to execute various applications such as a client application 354 and/or other applications. In particular, the client application 354 may be employed to receive instructions regarding dropping off items 112 or picking up items 112 at entry/exit points 106. Further, the client application 354 may be employed to report completion of tasks regarding items 112, such as dropping off items 112 or picking up items 112 at entry/exit points 106. The client application 354 may be a specialized application or may be a general browsing or communication application. The client application 354 may be executed in the agent client devices 306, for example, to access network content served up by the computing environment 303 and/or other servers, thereby rendering an agent user interface 357 on the display 351. To this end, the client application 354 may comprise, for example, a browser, a dedicated application, etc., and the agent user interface 357 may comprise a network page, an application screen, etc. The agent client devices 306 may be configured to execute applications beyond the client application 354 such as, for example, email applications, social networking applications, word processors, spreadsheets, and/or other applications.

Figure 4:
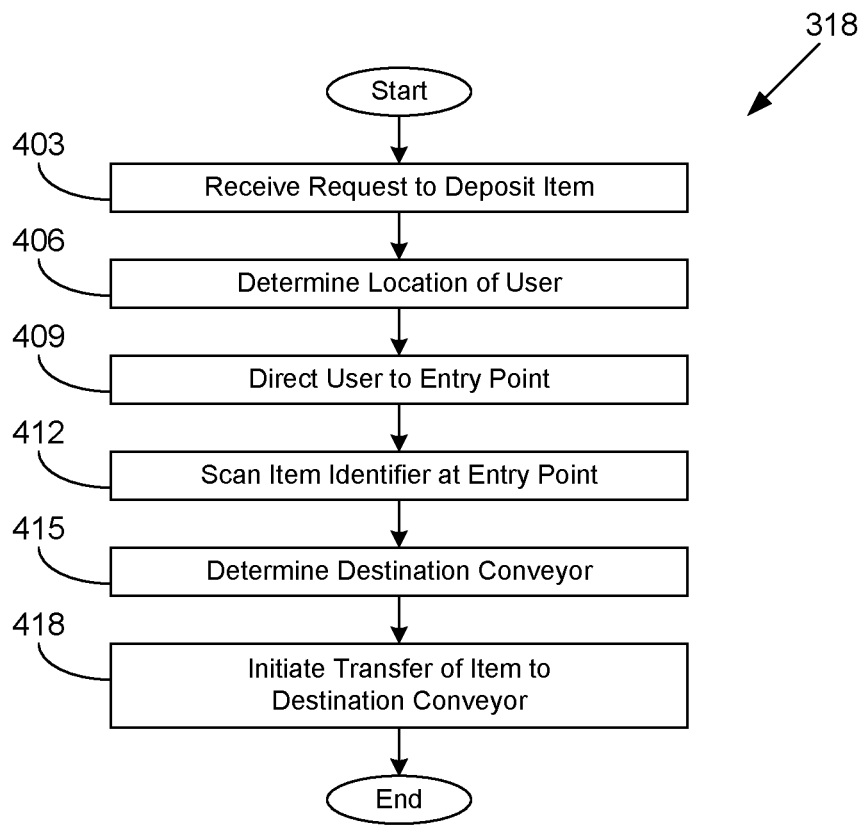
FIGS. 4-6 are flowcharts illustrating examples of functionality implemented as portions of a storage management system executed in a computing environment in the networked environment of FIG. 3 according to various embodiments of the present disclosure.

Referring next to FIG. 4, shown is a flowchart that provides one example of the operation of a portion of the storage management system 318 relating to receipt of items 112 (FIG. 1A) according to various embodiments. It is understood that the flowchart of FIG. 4 provides merely an example of the many different types of functional arrangements that may be employed to implement the operation of the portion of the storage management system 318 as described herein. As an alternative, the flowchart of FIG. 4 may be viewed as depicting an example of elements of a method implemented in the computing environment 303 (FIG. 3) according to one or more embodiments.

Beginning with box 403, the storage management system 318 receives a request to deposit an item 112 in the item storage system 100 (FIG. 2). For example, a user may scan an identifier 325 (FIG. 3) of the item 112 via the agent client device 306 (FIG. 2) and indicate that processing of a task is completed and a next task is to be performed. Alternatively, the storage management system 318, knowing the status 326 (FIG. 3) of the item 112 and/or the fulfillment center 200 (FIG. 2), may direct the user or automated equipment to deposit the item 112 in the item storage system 100.

In box 406, the storage management system 318 determines a location of the user in the fulfillment center 200. In box 409, the storage management system 318 directs the user to deposit the item 112 at a specific entry point for the item storage system 100. The specific entry point may be determined programmatically based at least in part on the user location in order to minimize the travel time of the user to the entry point. Alternatively, the user may simply deposit the item 112 at any convenient entry point.

In box 412, the storage management system 318 scans the identifier 325 of the item 112 at the entry point, thereby confirming the location of the item 112 in the item storage system 100. In box 415, the storage management system 318 determines a destination conveyor 103 (FIG. 1A). For example, the storage management system 318 may select one of the multiple conveyors 103 based at least in part on the priority 327 (FIG. 2) associated with the item 112 or the expected usage time 328 (FIG. 2) of the item 112. The capacity of the conveyor 103 may also be a parameter, as well as the speed of the conveyor 103. In general, faster conveyors 103 may be reserved for items 112 that are high priority or will be retrieved quickly from the item storage system 100. However, the determination of the conveyor 103 may depend on how much spare capacity the conveyor 103 has. For example, a lesser priority item 112 may be assigned to a faster conveyor 103 if the faster conveyor 103 has ample capacity. By contrast, a higher priority item 112 may be assigned to a slower conveyor 103 at least initially if the faster conveyor 103 does not have capacity.

The priority 327 may depend at least in part on whether the item 112 is undergoing inbound or outbound processing. Inbound items 112 may await storage in the fulfillment center 200 but may not be identified to specific orders, while outbound items 112 have already been ordered by customers. Thus, items 112 that have already been ordered may be given a greater priority 327 so that they can be retrieved faster from the item storage system 100.

In box 418, the storage management system 318 initiates a transfer of the item 112 to the destination conveyor 103. This may involve transport of the item 112 via various intermediate conveyors 103, elevators 109 (FIG. 1A), and ramp-based conveyors 118 (FIG. 1C), as well as the operation of various shoe devices 115 (FIG. 1B) or track redirectors 121 (FIG. 1D). Thereafter, the operation of the portion of the storage management system 318 ends.

Figure 5:
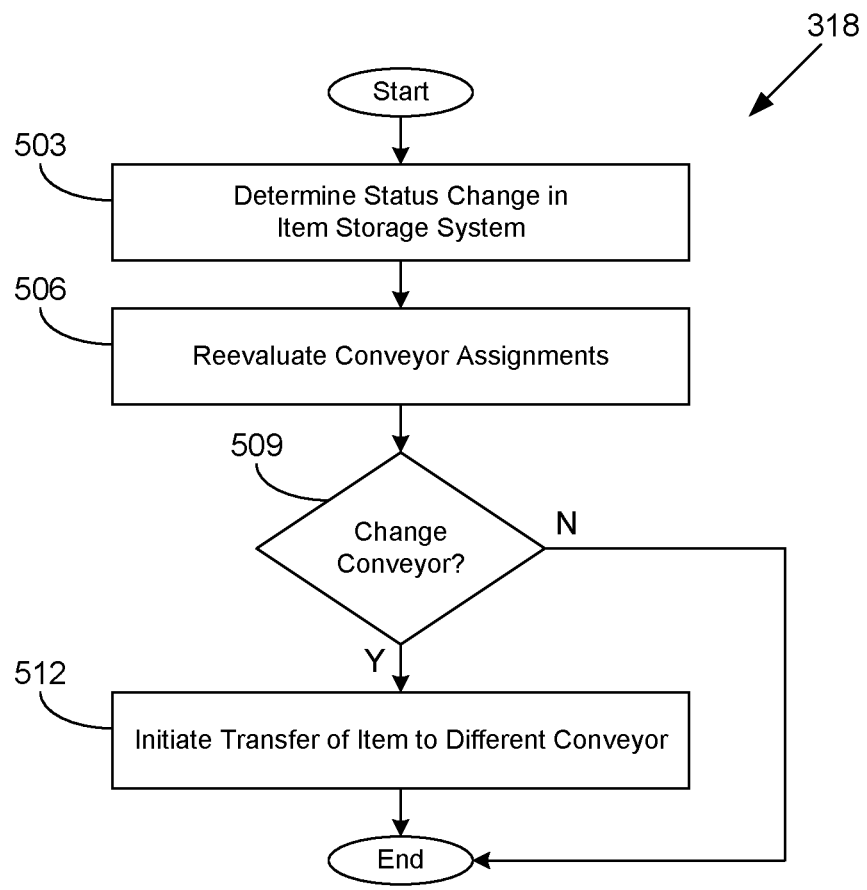

Turning now to FIG. 5, shown is a flowchart that provides one example of the operation of another portion of the storage management system 318 relating to updates in the state of an item storage system 100 (FIG. 2) according to various embodiments. It is understood that the flowchart of FIG. 5 provides merely an example of the many different types of functional arrangements that may be employed to implement the operation of the portion of the storage management system 318 as described herein. As an alternative, the flowchart of FIG. 5 may be viewed as depicting an example of elements of a method implemented in the computing environment 303 (FIG. 3) according to one or more embodiments.

Beginning with box 503, the storage management system 318 determines that a status change has occurred with respect to the item storage system 100. For example, additional items 112 (FIG. 1A) may be received, or items 112 may be removed. In box 506, the storage management system 318 reevaluates the assignments of items 112 to conveyors 103 (FIG. 1A) for optimality. A function involving multiple parameters and weights may be used to compute a value score associated with each assignment of an item 112 to a conveyor 103. Each move of an item 112 to a different conveyor 103 may also involve a cost in terms of delay and use of equipment, and these costs may be evaluated in determining whether to move an item 112 to a different conveyor 103 to improve optimality.

Examples of parameters may include the capacity of various conveyors 103, priority 327 (FIG. 3) of items 112 (e.g., higher priority items 112 may be on conveyors 103 that permit faster access), expected usage time 328 (FIG. 3) (e.g., items 112 that will be used sooner may be on conveyors 103 that permit faster access), size of the item 112 (e.g., larger items 112 consume more space on a conveyor 103 or may not fit on certain conveyors 103), type of the item 112 (e.g., fragile items 112 may not be dropped via a chute), weight of the items 112 (e.g., conveyors 103 may not support items 112 having beyond a certain maximum weight), other characteristics of the items 112, status of the fulfillment center 200 (FIG. 2) including status of processes and users in the fulfillment center 200, and other parameters.

As an example, it may be determined to move an item 112 from a higher speed conveyor 103 to a lower speed conveyor 103. Suppose that the item 112 was formerly of a higher priority 327, and due to the addition of items 112 having an even higher priority 327, the assignment of the item 112 to the higher speed conveyor 103 is no longer optimal. As a result, it may be worthwhile to incur the cost to move the item 112 to the lower speed conveyor 103 to make room for the higher priority items 112.

As another example, it may be determined to move an item 112 from a lower speed conveyor 103 to a higher speed conveyor 103. Suppose that numerous items 112 have been removed from the higher speed conveyor 103. Although the item 112 previously might not have warranted an assignment to the higher speed conveyor 103, the expected access time 328 may be closer and the cost of potentially having to reorganize to accommodate higher priority items 112 may be relatively low. As a result, it may be worthwhile to move the item 112 to the higher speed conveyor 103.

As another example, it may be determined to move an item 112 from a vertically lower conveyor 103 to a vertically higher conveyor 103. It may be that the item 112 may not be used for some time due to a backlog in a process that would use the item 112 (e.g., gift wrapping). Therefore, the expected access time 328 of the item 112 may increase, and the item 112 may be moved to an upper-level conveyor 103 associated with a greater time for access. Even if the item 112 may have a relatively high priority 327, the priority 327 may be weighted relatively lower in this example than the expected access time 328.

As yet another example, it may be determined to move an item 112 from a vertically higher conveyor 103 to a vertically lower conveyor 103. Suppose that the expected access time 328 of the item 112 is approaching. If the item 112 cannot be retrieved directly from the higher conveyor 103, the item 112 may be moved to the lower conveyor 103 to facilitate faster access.

In box 509, the storage management system 318 determines whether to change the conveyor 103 to which a given item 112 has been assigned. If the storage management system 318 decides not to change the conveyor 103, the operation of the portion of the storage management system 318 ends. However, if the storage management system 318 decides to change the conveyor 103, the storage management system 318 initiates the transfer of the item 112 to a different conveyor 103 in box 512. This may involve transport of the item 112 via various intermediate conveyors 103, elevators 109 (FIG. 1A), and ramp-based conveyors 118 (FIG. 1C), as well as the operation of various shoe devices 115 (FIG. 1B) or track redirectors 121 (FIG. 1D). The item 112 may be transferred to a faster or slower conveyor 103. In some cases, rather than transferring items 112, the speed of a conveyor 103 may be changed. Thereafter, the operation of the portion of the storage management system 318 ends.

Figure 6:
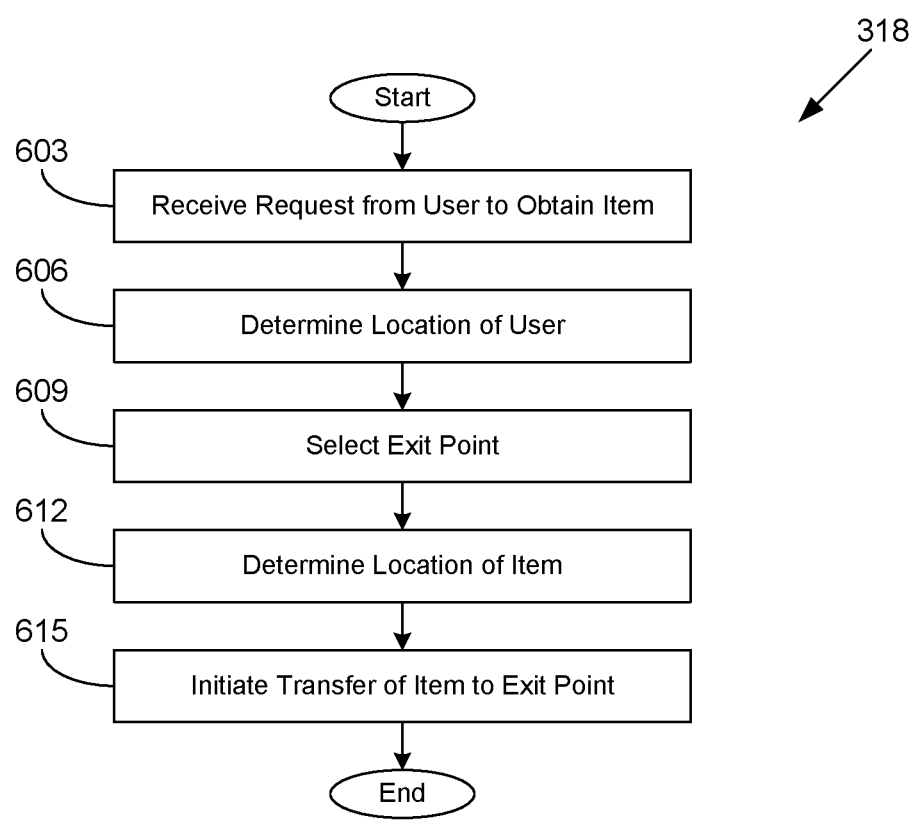

Moving to FIG. 6, shown is a flowchart that provides one example of the operation of another portion of the storage management system 318 relating to retrieval of items 112 (FIG. 1A) from an item storage system 100 (FIG. 2) according to various embodiments. It is understood that the flowchart of FIG. 6 provides merely an example of the many different types of functional arrangements that may be employed to implement the operation of the portion of the storage management system 318 as described herein. As an alternative, the flowchart of FIG. 6 may be viewed as depicting an example of elements of a method implemented in the computing environment 303 (FIG. 3) according to one or more embodiments.

Beginning with box 603, the storage management system 318 receives a request from a user to obtain an item 112 (FIG. 1A). For example, a request may be submitted via an agent client device 306 (FIG. 3). Alternatively, a user may be instructed to pick up a given item 112. In box 606, the storage management system 318 determines the location of the user. In box 609, the storage management system 318 selects one of multiple exit points, for example, using the location of the user to minimize travel time. The user may be instructed to go to a particular exit point or the user may simply go to a convenient exit point, which is then identified by the storage management system 318.

In box 612, the storage management system 318 determines the location of the item 112 in the storage management system 318. In box 615, the storage management system 318 initiates a transfer of the item 112 to the exit point. This may involve transporting the item 112 via various intermediate conveyors 103, elevators 109 (FIG. 1A), and ramp-based conveyors 118 (FIG. 1C), and the operation of various shoe devices 115 (FIG. 1B) or track redirectors 121 (FIG. 1D). Thereafter, the operation of the portion of the storage management system 318 ends.

Figure 7:
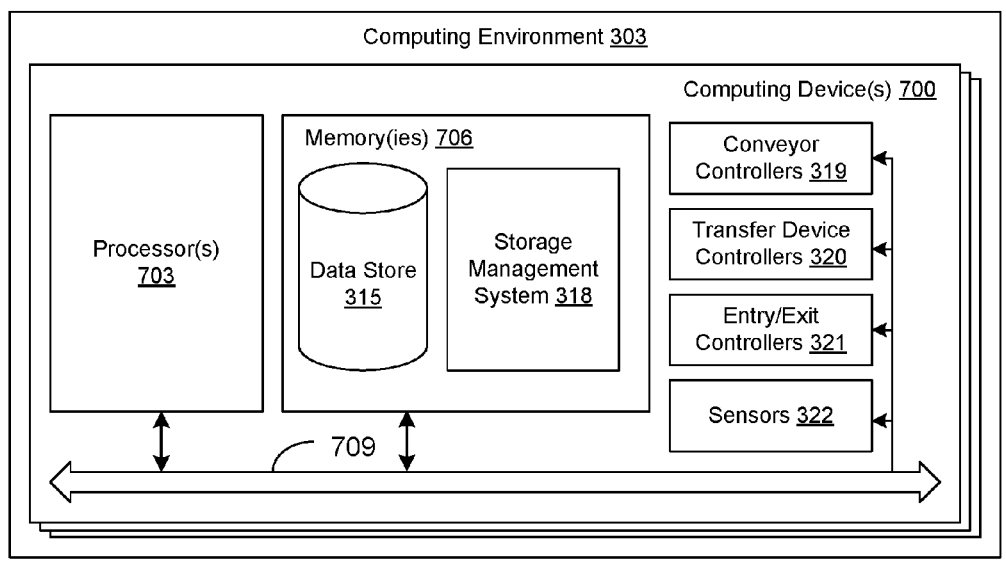
FIG. 7 is a schematic block diagram that provides one example illustration of a computing environment employed in the networked environment of FIG. 3 according to various embodiments of the present disclosure.

With reference to FIG. 7, shown is a schematic block diagram of the computing environment 303 according to an embodiment of the present disclosure. The computing environment 303 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated. The conveyor controllers 319, the transfer device controllers 320, the entry/exit controllers 321, and the sensors 322 may also be coupled to the local interface 709.

Stored in the memory 706 are both data and several components that are executable by the processor 703. In particular, stored in the memory 706 and executable by the processor 703 are the storage management system 318 and potentially other applications. Also stored in the memory 706 may be a data store 315 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the storage management system 318 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the storage management system 318. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the storage management system 318, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the storage management system 318, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 303.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should Therefore, the following is claimed:

1. A method, comprising:
    scanning, by at least one computing device, an identifier of an item being deposited in an item storage system;
    determining, by the at least one computing device, a priority associated with the item;
    selecting, by the at least one computing device, one of a plurality of conveyors in the item storage system for storage of the item based at least in part on the priority, wherein each of the plurality of conveyors is configured to store a plurality of items in motion in a circuit arrangement, at least two of the plurality of conveyors are configured to operate at different speeds, and at least two of the plurality of conveyors are arranged concentrically with respect to one another; and
    initiating, by the at least one computing device, a transfer of the item to the one of the plurality of conveyors.

2. The method of claim 1, further comprising:
    determining, by the at least one computing device, a utilization of the one of the plurality of conveyors; and
    wherein the one of the plurality of conveyors is selected further based at least in part on the utilization.

3. The method of claim 1, further comprising:
    scanning, by the at least one computing device, an identifier of another item being deposited in the item storage system;
    determining, by the at least one computing device, a priority associated with the other item; and
    initiating, by the at least one computing device, another transfer of the item to another one of the plurality of conveyors based at least in part on the priority of the other item in order to accommodate the other item on the one of the plurality of the conveyors.

4. The method of claim 1, further comprising:
    receiving, by the at least one computing device, a request to retrieve the item from the item storage system;
    selecting, by the at least one computing device, one of a plurality of exit points based at least in part on a location associated with the request; and
    causing, by the at least one computing device, the item to exit the one of the plurality of conveyors at the one of the plurality of exit points.

5. The method of claim 1, further comprising:
    determining, by the at least one computing device, an updated priority associated with the item;
    selecting, by the at least one computing device, another one of the plurality of conveyors based at least in part on the updated priority; and
    initiating, by the at least one computing device, a transfer of the item from the one of the plurality of conveyors to the other one of the plurality of conveyors.

6. The method of claim 1, wherein at least two of the plurality of conveyors are vertically stacked over at least a portion of one another.

7. An item storage system, comprising:
    a first conveyor;
    a second conveyor, wherein the first conveyor and the second conveyor each store a plurality of items in motion in a circuit arrangement, and the first conveyor and the second conveyor are arranged concentrically with respect to one another;
    a transfer device configured to transfer items to the first conveyor or the second conveyor; and
    at least one computing device configured to perform a method comprising:
        scanning, by at least one computing device, an identifier of an item being deposited in the item storage system;
        determining, by the at least one computing device, a priority associated with the item;
        selecting, by the at least one computing device, one of the first conveyor or the second conveyor based at least in part on the priority; and
        initiating, by the at least one computing device, a transfer of the item to the selected one of the first conveyor or the second conveyor using the transfer device.

8. The item storage system of claim 7, wherein the first conveyor and the second conveyor operate at different speeds.

9. The item storage system of claim 7, wherein the transfer device comprises an elevator.

10. The item storage system of claim 7, wherein the transfer device comprises at least one of a ramp-based conveyor, slide, or chute.

11. The item storage system of claim 7, wherein the first conveyor utilizes a belt to move the plurality of items in the circuit arrangement.

12. The item storage system of claim 7, wherein the first conveyor utilizes a plurality of rollers to move the plurality of items in the circuit arrangement.

13. The item storage system of claim 7, wherein the at least one computing device is configured to perform the method further comprising:
    determining, by the at least one computing device, a utilization of the one of the first conveyor or the second conveyor; and
    wherein the one of the first conveyor or the second conveyor is selected further based at least in part on the utilization.

14. The item storage system of claim 7, wherein the at least one computing device is configured to perform the method further comprising:
    scanning, by the at least one computing device, an identifier of another item being deposited in the item storage system;
    determining, by the at least one computing device, a priority associated with the other item; and
    initiating, by the at least one computing device, another transfer of the item to another one of the first conveyor or the second conveyor based at least in part on the priority of the other item in order to accommodate the other item on the one of the first conveyor or the second conveyor.

15. The item storage system of claim 7, wherein the at least one computing device is configured to perform the method further comprising:
    receiving, by the at least one computing device, a request to retrieve the item from the item storage system;
    selecting, by the at least one computing device, one of a plurality of exit points based at least in part on a location associated with the request; and causing, by the at least one computing device, the item to exit the one of the first conveyor or the second conveyor at the one of the plurality of exit points.

16. The item storage system of claim 7, wherein the at least one computing device is configured to perform the method further comprising:
   determining, by the at least one computing device, an updated priority associated with the item;
   selecting, by the at least one computing device, another one of the first conveyor or the second conveyor based at least in part on the updated priority; and
   initiating, by the at least one computing device, a transfer of the item from the one of the first conveyor or the second conveyor to the other one of the first conveyor or the second conveyor.

17. An item storage system, comprising:
   a first conveyor operating at a first speed;
   a second conveyor arranged concentrically with the first conveyor and operating at a second speed that is greater than the first speed, wherein the first conveyor and the second conveyor each store a plurality of items in motion in a circuit arrangement;
   a transfer device configured to transfer items between the first conveyor and the second conveyor; and
   at least one computing device configured to perform a method comprising:
      determining, by the at least one computing device, a priority associated with an item stored on the first conveyor;
      initiating, by the at least one computing device, a transfer of the item from the first conveyor to the second conveyor via the transfer device in response to the priority meeting a minimum threshold.

18. The item storage system of claim 17, wherein the at least one computing device is configured to perform the method further comprising:
   receiving, by the at least one computing device, a request to retrieve the item from the item storage system;
   identifying, by the at least one computing device, one of a plurality of exit points for the second conveyor based at least in part on a location of a user associated with the request; and
   causing, by the at least one computing device, the item to exit the item storage system via the one of the plurality of exit points.

19. The item storage system of claim 17, wherein the priority is determined based at least in part on whether the item is an inbound item or an outbound item.

20. The item storage system of claim 17, wherein at least one of the first speed or the second speed is adjustable.

* * * * *